United States Patent [19]
Sugimoto et al.

[11] Patent Number: 5,988,718
[45] Date of Patent: Nov. 23, 1999

[54] LOAD RETAINER ASSEMBLY AND RETAINING APPARATUS

[75] Inventors: Yasuo Sugimoto; Taro Fukuda, both of Wako, Japan

[73] Assignee: Honda Giken Kogyo Kabushiki Kaisha, Japan

[21] Appl. No.: 09/201,183

[22] Filed: Nov. 30, 1998

[30] Foreign Application Priority Data

Dec. 2, 1997 [JP] Japan .................................. 9-332155

[51] Int. Cl.$^6$ ...................................................... B66C 1/02
[52] U.S. Cl. ........................ 294/65; 294/81.2; 414/627; 414/737
[58] Field of Search .......................... 294/65, 81.2, 81.4, 294/81.5, 81.6; 414/627, 737, 738, 752, 783, 798.5

[56] References Cited

U.S. PATENT DOCUMENTS

| | | | |
|---|---|---|---|
| 2,903,290 | 9/1959 | Morris et al. | 294/65 |
| 3,610,673 | 10/1971 | Strombeck et al. | 294/65 |
| 4,444,424 | 4/1984 | Lebret | 294/65 |
| 4,685,714 | 8/1987 | Hoke | 294/65 |
| 5,566,466 | 10/1996 | Hearne | 414/783 |

FOREIGN PATENT DOCUMENTS 7206211 8/1995 Japan .

*Primary Examiner*—Dean J. Kramer
*Attorney, Agent, or Firm*—Adams & Wilks

[57] ABSTRACT

A load retainer assembly includes a pair of lower and upper plates pivotably mounted on a main shaft, and an inverting mechanism provided between the lower and upper plates that, as the lower plate is driven to pivot, causes the upper plate to pivot in the opposite direction to the pivoting direction of the lower plate. The load retainer assembly further includes a first retaining member for interconnecting distal end portions of a pair of links pivotably connected to one end of the lower plate and one end of the upper plate, respectively, and a second retaining member for interconnecting distal end portions of another pair of links pivotably connected to the other end of the lower plate and the other end of the upper plate, respectively. A suction pad is attached to each of the retaining members to retain a load by suction. The first and second retaining members are movable toward and away from each other by causing the upper plate to pivot in the opposite direction to the pivoting direction of the lower plate, and with this arrangement the load retainer assembly can be moved between folded and unfolded positions.

3 Claims, 13 Drawing Sheets

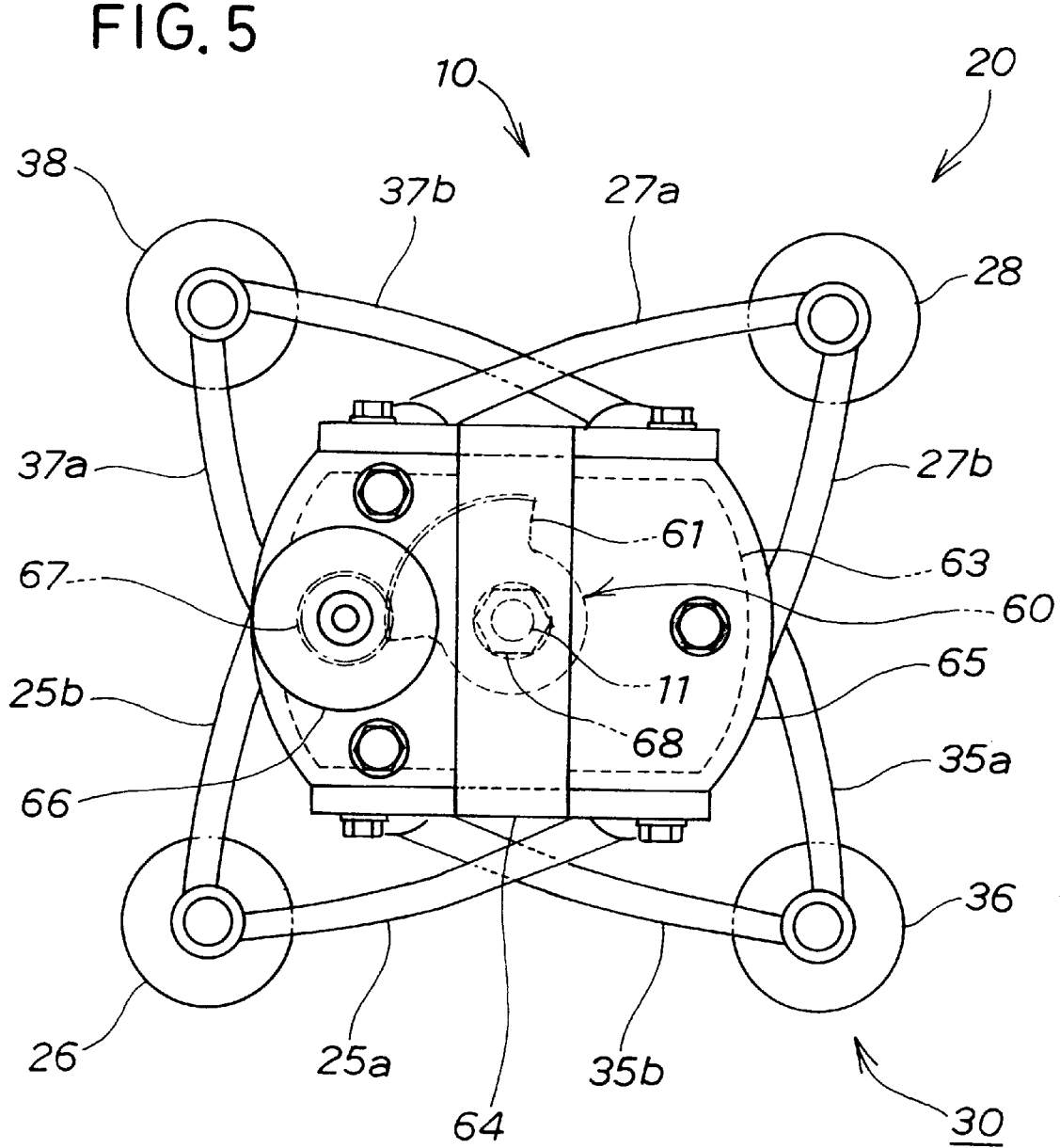

LOAD RETAINER ASSEMBLY AND RETAINING APPARATUS

BACKGROUND OF THE INVENTION

1. Field of the Invention

The present invention relates generally to load retainer assemblies and load retaining apparatus which retain a load, such as a workpiece, by means of a plurality of suction pads to carry the thus-retained load to a desired place, and more particularly to an improved load retainer assembly and load retaining apparatus which allow the individual suction pads to be adjusted in position as desired.

2. Description of the Related Art

There are known various apparatus for retaining a load by means of suction pads to carry the load to a desired place, an example of which is disclosed in Japanese Patent Laid-open Publication No. HEI-7-206211 under the title of "Load Carrier Apparatus". The disclosed carrier apparatus includes a beam-shaped carrier body, and a pair of retaining frames connected to the carrier body in such a way that the retaining frames are movable, via associated electric motors, along the length of the body so as to adjust a distance between the two. On each of the retaining frames is mounted a suction pad holder for sliding movement on and along the retaining frame, and a disk-shaped suction pad is attached to each of the holders for adhering to and retaining a load by suction. Also, drive means, such as feed screws or motors, are provided on the retaining frames in order to move the respective suction pad holders.

However, in the disclosed carrier apparatus arranged as above, the retaining frames are each fixed in length (i.e., have an invariable length), and the retaining frames would often strike a wall or the like in a small working place, making the load carrying operations considerably difficult. Further, because the drive means, such as feed screws or motors, for moving the suction pad holders are provided on the retaining frames and the motors for adjusting the distance between the retaining frames are mounted on the carrier body, the carrier apparatus has a relatively great total weight, which would give a very heavy load on the driving and supporting mechanisms of the apparatus.

SUMMARY OF THE INVENTION

It is therefore a first object of the present invention to provide a load retainer assembly which is adjustable in its load-retaining span depending on the size of a load to be retained thereby.

It is a second object of the present invention to provide a load retaining apparatus which can be used efficiently even in a small working place.

According to a first aspect of the present invention, there is provided a load retainer assembly for retaining a load by suction to carry the load to a desired place, which comprises: a main shaft; a lower plate pivotably mounted on the main shaft and including a pair of left and right swing arms; an upper plate pivotably mounted on the main shaft in parallel relation to the lower plate and including a pair of left and right swing arms; an inverting mechanism disposed between the lower plate and the upper plate, for, as the lower plate is pivoted, causing the upper plate to pivot in an opposite direction to a pivoting direction of the lower plate; a first retaining member for interconnecting distal end portions of a pair of links pivotably connected to one of the swing arms of the lower plate and one of the swing arms of the upper plate, respectively; a second retaining member for interconnecting distal end portions of another pair of links pivotably connected to the other swing arm of the lower plate and the other swing arm of the upper plate, respectively; and suction pads attached to the first retaining member and the second retaining member, respectively, to retain the load by suction. The first retaining member and the second retaining member are movable toward and away from each other by causing the upper plate to pivot in the opposite direction to the pivoting direction of the lower plate.

As the lower plate is driven to pivot, the inverting mechanism, disposed between the lower plate and the upper plate, allows the upper plate to pivot in the opposite direction to the lower plate. As the lower and upper plates are thus pivoted in opposite directions, the links are moved to a folded or unfolded position, so that the first and second retaining members are movable toward and away from each other. With this arrangement, the working range or load-retaining span of the load retainer assembly can be varied depending on the size of a load to be retained, and thus the load retainer assembly can be used efficiently with no inconvenience even in a narrow working place.

According to a second aspect of the present invention, there is provided a load retaining apparatus for retaining a load by suction to carry the load to a desired place, which comprises:

(a) a pair of upper and lower load retainer assemblies; each of the load retaining assemblies comprising: a main shaft; a lower plate pivotably mounted on the main shaft and including a pair of left and right swing arms; an upper plate pivotably mounted on the main shaft in parallel relation to the lower plate and including another pair of left and right swing arms; an inverting mechanism disposed between the lower plate and the upper plate, for, as the lower plate is pivoted, causing the upper plate to pivot in an opposite direction to a pivoting direction of the lower plate; a first retaining member for interconnecting distal end portions of a pair of links pivotably connected to one of the swing arms of the lower plate and one of the swing arms of the upper plate, respectively; a second retaining member for interconnecting distal end portions of another pair of links pivotably connected to the other swing arm of the lower plate and the other swing arm of the upper plate, respectively; and suction pads attached to the first retaining member and the second retaining member, respectively, to retain the load by suction, the upper and lower load retainer assemblies being coupled together in overlapping relation to each other in such a manner that a total of four retaining members of the upper and lower load retainer assemblies are located at four corners of an imaginary rectangular area defined by outermost ends of the upper and lower load retainer assemblies; and (b) a synchronizing mechanism disposed between the upper and lower load retainer assemblies, for, as the upper load retainer assembly is pivoted, causing the lower load retainer assembly to pivot in an opposite direction to a pivoting direction of the upper load retainer assembly.

By the provision of the synchronizing mechanism between the upper and lower load retainer assemblies, the four retaining members, and hence four suction pads, can be held at four corners of an imaginary rectangular area defined by outermost ends of the upper and lower load retainer assemblies.

In a preferred implementation, the load retaining apparatus further comprises an upper brake mechanism for braking the upper load retainer assembly against pivotal movement relative to the main shaft, and a lower brake mechanism for braking the lower load retainer assembly against pivotal movement relative to the main shaft. Thus, the four retaining members, and hence four suction pads, can be reliably held at the four corners of the imaginary rectangular area.

BRIEF DESCRIPTION OF THE DRAWINGS

Preferred embodiments of the present invention will be described hereinbelow, by way of example only, with reference to the accompanying drawings, in which:

FIG. 5 is a plan view of the load retaining apparatus of FIG. 2;

DETAILED DESCRIPTION OF THE PREFERRED EMBODIMENTS

The following description is merely exemplary in nature and is in no way intended to limit the invention or its application or uses.

Figure 1:
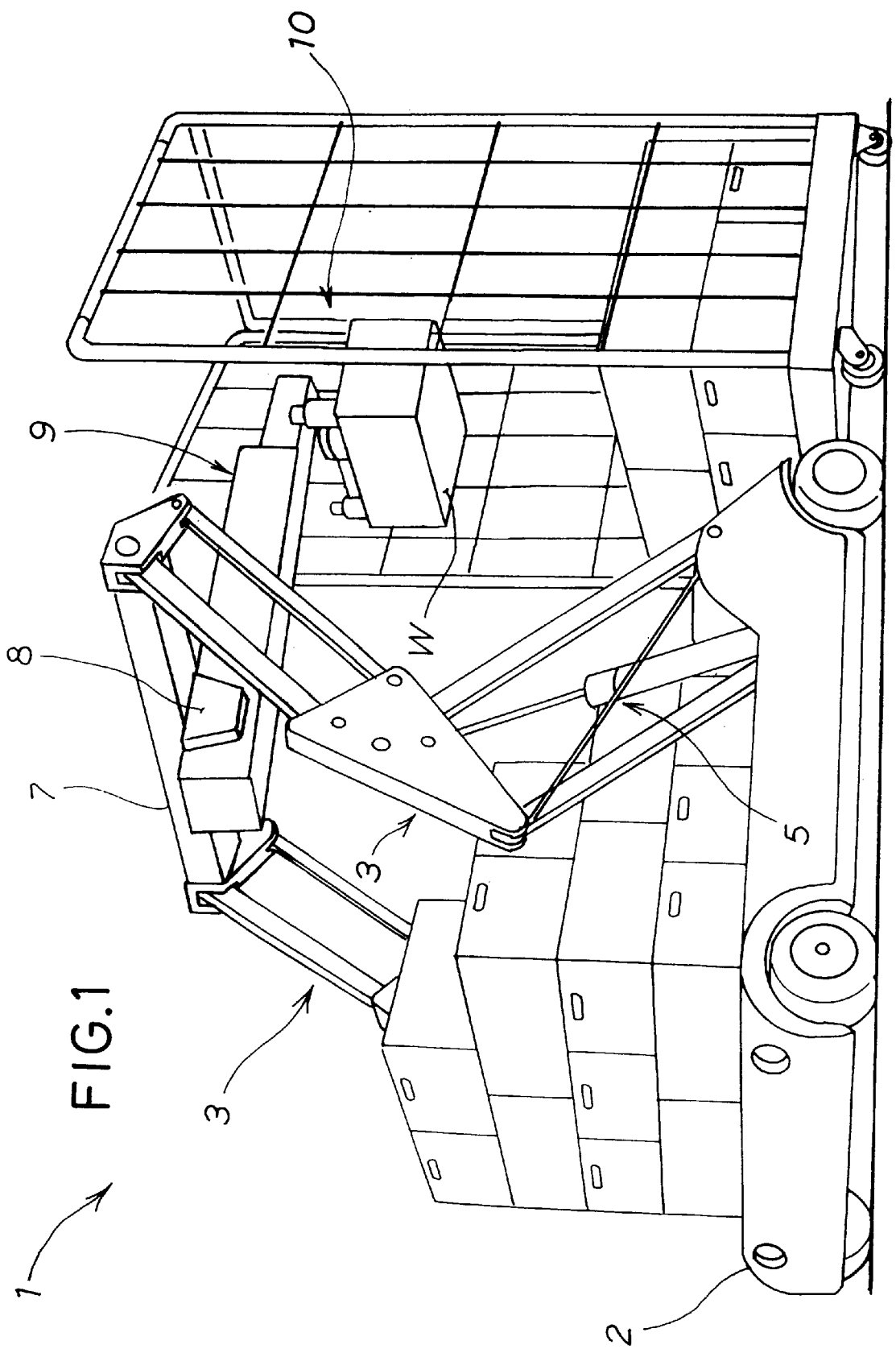
FIG. 1 is a perspective view of a load carrier vehicle including a load retaining apparatus in accordance with an embodiment of the present invention.

FIG. 1 is a perspective view of a load carrier vehicle including a load retaining apparatus in accordance with an embodiment of the present invention. The carrier vehicle 1 functions to transport a load W, such as a workpiece, from a container to a truck 2 or from the truck 2 to the container. A pair of left and right support arms 3 are connected to opposite sides of the truck 2. Each of the left and right support arms 3 has an articulated portion so that it can bend up and down at its substantially central portion, and a balancer or counterbalance mechanism 5 is provided to prevent the arm 3 from accidentally toppling down. A cross member 7 is connected between the upper ends of the two support arms 3, and a movable member 8 is provided for horizontal movement along the length of the cross member 7. To the movable member 8 is attached a multistage sliding arm 9 that is capable of extension and contraction in a direction transverse to the cross member 7. To the distal end of the sliding arm 9 is connected the load retaining apparatus 10 of the present invention.

Figure 2:
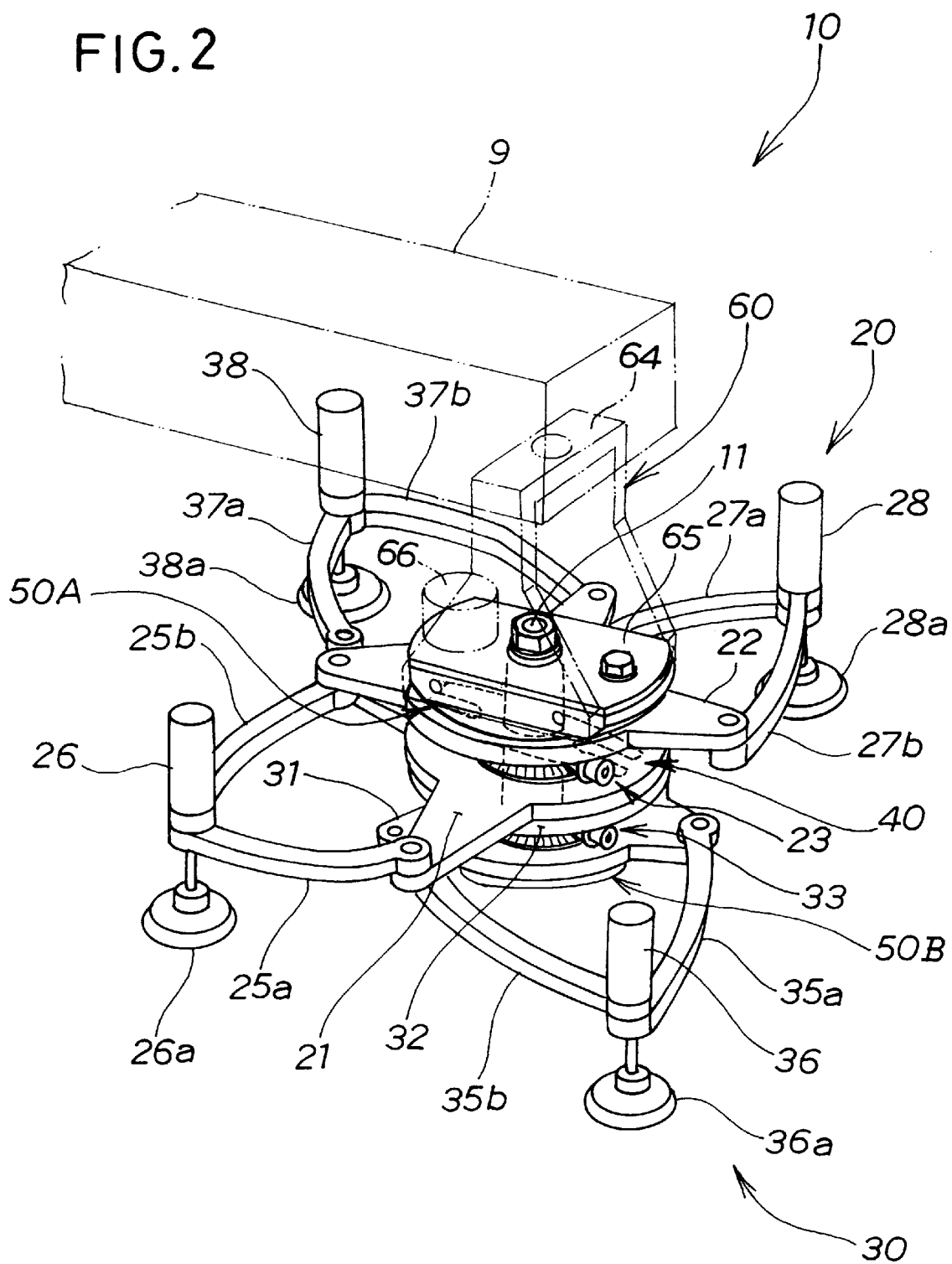
FIG. 2 is a perspective view showing details of the load retaining apparatus of FIG. 1.

FIG. 2 is a perspective view showing details of the load retaining apparatus of FIG. 1. The load retaining apparatus 10 includes a first or upper load retainer assembly 20 pivotably mounted on an upper end portion of a motor-driven main shaft 11 and a second or lower load retainer assembly 30 pivotably mounted on a lower end portion of the main shaft 11. Between the first and second load retainer assemblies 20 and 30, there is disposed a synchronizing mechanism 40 that synchronizes the motion of these load retainer assemblies 20 and 30. Further, upper and lower brake mechanisms 50A and 50B are provided on the upper and lower end portions of the main shaft 11, respectively. The multistage sliding arm 9 and main shaft 11 are interconnected by means of a suspension unit 60.

Figure 3:
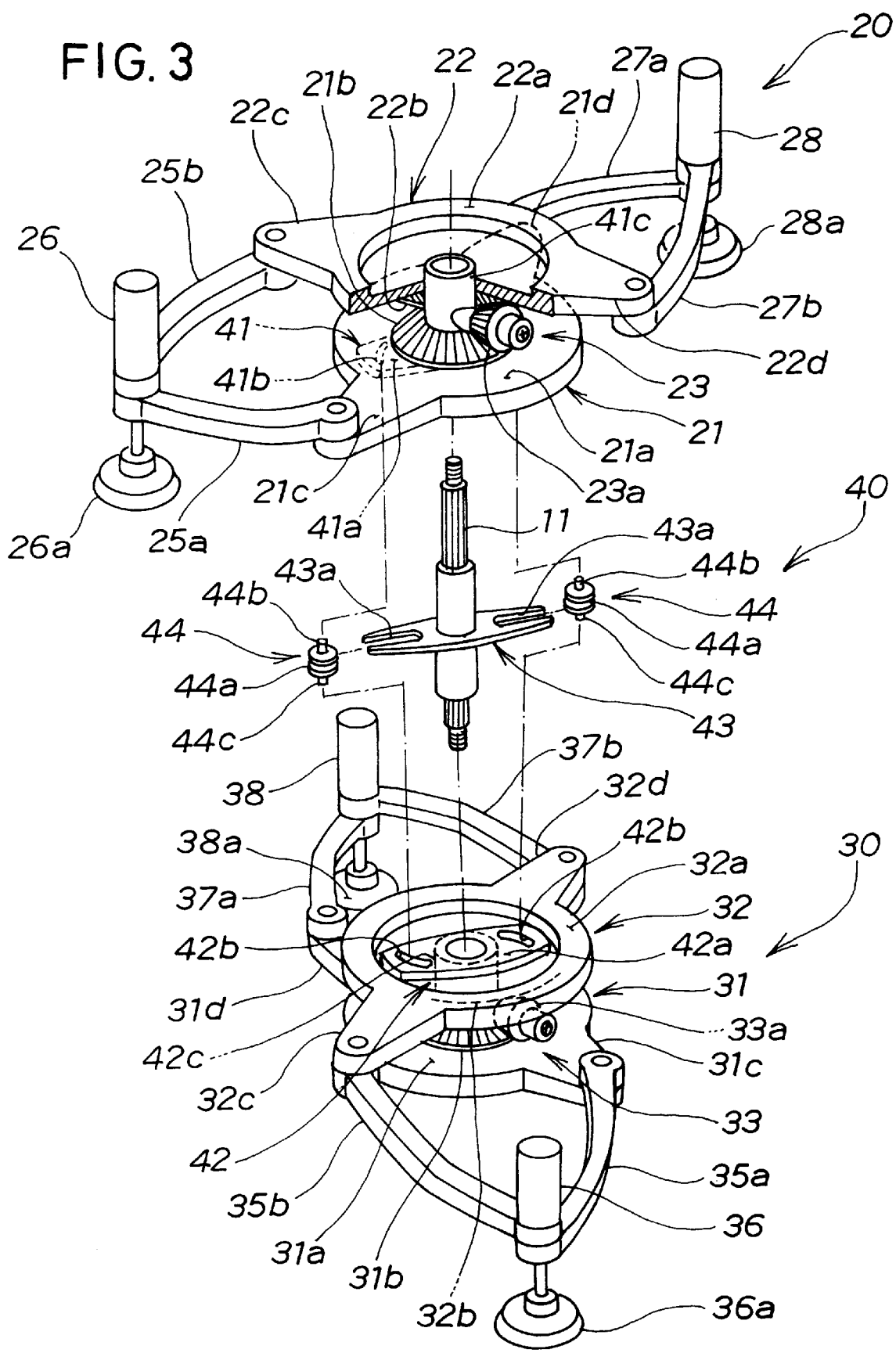
FIG. 3 is an exploded perspective view of the load retaining apparatus of FIG. 2.

As shown more fully in FIG. 3, the above-mentioned first load retainer assembly 20 includes a lower plate 21 pivotably mounted on the main shaft 11 via the synchronizing mechanism 40, and an upper plate 22 pivotably mounted on the main shaft 11 via the synchronizing mechanism 40 in parallel relation to the lower plate 21. An inverting mechanism 23 is provided between the lower and upper plates 21 and 22. A link 25a is rotatably connected at one end to the lower plate 21 while a link 25b is rotatably connected at one end to the upper plate 22. The other ends of these links 25a and 25b are rotatably connected to a retaining member 26. Further, a link 27a is rotatably connected at one end to the lower plate 21 while a link 27b is rotatably connected at one end to the upper plate 22. The other ends of these links 27a and 27b are rotatably connected to another retaining member 28. Reference numeral 26a represents a suction pad that is attached to the retaining member 26 for retaining a load W by suction, and 28a represents another suction pad attached to the retaining member 28.

The lower plate 21 of the first load retainer assembly 20 includes a plate portion 21a mounted on the main shaft 11, and a pair of swing arms 21c and 21d extending radially from the plate portion 21a in opposite directions. A bevel gear 21b is secured to the plate portion 21a for synchronizing the lower plate 21 with the upper plate 22.

The upper plate 22 of the first load retainer assembly 20 includes a plate portion 22a pivotably mounted on the main shaft 11, and a pair of swing arms 22c and 22d extending radially from the plate portion 22a in opposite directions. A bevel gear 22b is secured to the plate portion 22a for synchronizing the upper plate 22 with the lower plate 21.

The one end of the link 25a is rotatably connected to the swing arm 21c of the lower plate 21, and the one end of the link 25b is rotatably connected to the swing arm 22c of the upper plate 22. Similarly, the one end of the link 27a is rotatably connected to the swing arm 21d of the lower plate 21, and the one end of the link 27b is rotatably connected to the swing arm 22d of the upper plate 22.

The inverting mechanism 23 of the first load retainer assembly 20 comprises a bevel gear 23a rotatably connected to the synchronizing mechanism 40, the bevel gear 21b attached to the lower plate 21, and the bevel gear 22b attached to the upper plate 22. In this inverting mechanism 23, the bevel gears 21b and 22b are coupled with each other via the bevel gear 23a so that pivotal movement of the lower plate 21 in one direction causes the upper plate 22 to pivot in the opposite direction synchronously with the lower plate 21.

The second load retainer assembly 30 is constructed in a similar manner to the above-described first load retainer assembly 20. Namely, the second load retainer assembly 30 includes a lower plate 31 pivotably mounted on the main shaft 11, and an upper plate 32 pivotably mounted on the main shaft 11 in parallel relation to the lower plate 31. An inverting mechanism 33 is provided between the lower and upper plates 31 and 32. A link 35a is rotatably connected at one end to the lower plate 31 while a link 35b is rotatably connected at one end to the upper plate 32. The other ends of these links 35a and 35b are rotatably connected to a retaining member 36. Further, a link 37a is rotatably connected at one end to the lower plate 31 while a link 37b is rotatably connected at one end to the upper plate 32. The other ends of these links 37a and 37b are rotatably connected to another retaining member 38. Reference numeral 36a represents a suction pad that is attached to the retaining member 36 for retaining a load by suction, and 38a represents another suction pad attached to the retaining member 38.

The lower plate 31 of the second load retainer assembly 30 includes a plate portion 31a mounted on the main shaft 11, and a pair of swing arms 31c and 31d extending radially from the plate portion 31a in opposite directions. A bevel gear 31b is secured to the plate portion 31a for synchronizing the lower plate 31 with the upper plate 32.

The upper plate 32 of the second load retainer assembly 30 includes a plate portion 32a mounted on the main shaft 11, and a pair of swing arms 32c and 32d extending radially from the plate portion 32a in opposite directions. A bevel gear 32b is secured to the plate portion 32a for synchronizing the upper plate 32 with the lower plate 31.

The one end of the link 25a is rotatably connected to the swing arm 31c of the lower plate 31, and the one end of the link 35b is rotatably connected to the swing arm 32c of the upper plate 32. Similarly, the one end of the link 37a is rotatably connected to the swing arm 31d of the lower plate 31, and the one end of the link 37b is rotatably connected to the swing arm 32d of the upper plate 32.

The inverting mechanism 33 comprises a bevel gear 33a rotatably connected to the synchronizing mechanism 40, the bevel gear 31b attached to the lower plate 31, and the bevel gear 32b attached to the upper plate 32. In this inverting mechanism 33, the bevel gears 31b and 32b are coupled with each other via the bevel gear 33a so that pivotal movement of the lower plate 31 in one direction causes the upper plate 32 to pivot in the opposite direction synchronously with the lower plate 31.

As further shown in FIG. 3, the synchronizing mechanism 40 includes a first converting member 41 pivotably mounted on an upper end portion of the main shaft 11, a second converting member 42 pivotably mounted on a lower end portion of the main shaft 11, a synchronizing member 43 fixed to the main shaft 11, and a pair of movable connector pieces 44 connecting together the first and second converting members 41 and 42 and synchronizing member 43.

The first converting member 41 of the synchronizing mechanism 40 has a rectangular plate portion 41a, in which are formed a pair of arcuate grooves 41b (only one of them shown in the figure) eccentrically to the main shaft 11. The first converting member 41 also has a cylindrical portion 41c extending upward from a central portion thereof. The cylindrical portion 41c is rotatably fitted over the main shaft 11, and the above-mentioned bevel gear 23a of the inverting mechanism 23 is supported on the outer periphery of the cylindrical portion 41c. The arcuate grooves 41b cause the connector pieces 44 to slide along elongate through-holes 43a defined by bifurcated end portions of the synchronizing member 43.

Similarly, the second converting member 42 of the synchronizing mechanism 40 has a rectangular plate portion 42a, in which are formed a pair of arcuate grooves 42b eccentrically to the main shaft 11. The eccentric arcuate grooves 41b of the first converting member 41 and the eccentric arcuate grooves 42b of the second converting member 42, as viewed in plan, are formed to overlap substantially crosswise with each other in substantially symmetric relation with each other, as will be later described in relation to FIG. 6B. The second converting member 42 also has a cylindrical portion 42c extending downward from a central portion thereof. The cylindrical portion 42c is rotatably fitted over the main shaft 11, and the above-mentioned bevel gear 33a of the inverting mechanism 33 is supported on the outer periphery of the cylindrical portion 42c. The arcuate grooves 42b cause the connector pieces 44 to slide along the above-mentioned elongate through-holes 43a.

The above-mentioned lower and upper plates 21 and 22 of the first load retainer assembly 20 are pivotably mounted on the main shaft 11 via the cylindrical portion 41c of the first converting member 41. Similarly, the above-mentioned lower and upper plates 31 and 32 of the second load retainer assembly 30 are pivotably mounted on the main shaft 11 via the cylindrical portion 42c of the second converting member 42. The bevel gear 23a of the inverting mechanism 23 is rotatably mounted on the cylindrical portion 41c, and the bevel gear 33a of the inverting mechanism 33 is rotatably mounted on the cylindrical portion 42c.

The synchronizing member 43, which is mounted on the main shaft 11 between the first and second load retainer assemblies 20 and 30, comprises an elongate plate extending transversely across the axis of the main shaft 11. The through-holes 43a defined by the bifurcated end portions are open outwardly, i.e., away from the main shaft 11.

Each of the movable connector pieces 44 is substantially in the shape of a column and has a central recessed portion 44a around the outer periphery of the column, and the central recessed portion 44a is fitted in one of the through-holes 43a of the synchronizing member 43. Each of the movable connector pieces 44 also has upper and lower projections 44b and 44c; the upper projection 44b is fitted in the arcuate groove 41b formed in the first converting member 41 of the synchronizing mechanism 40 while the lower projection 44c is fitted in the arcuate groove 42b formed in the second converting member 42.

Figure 4:
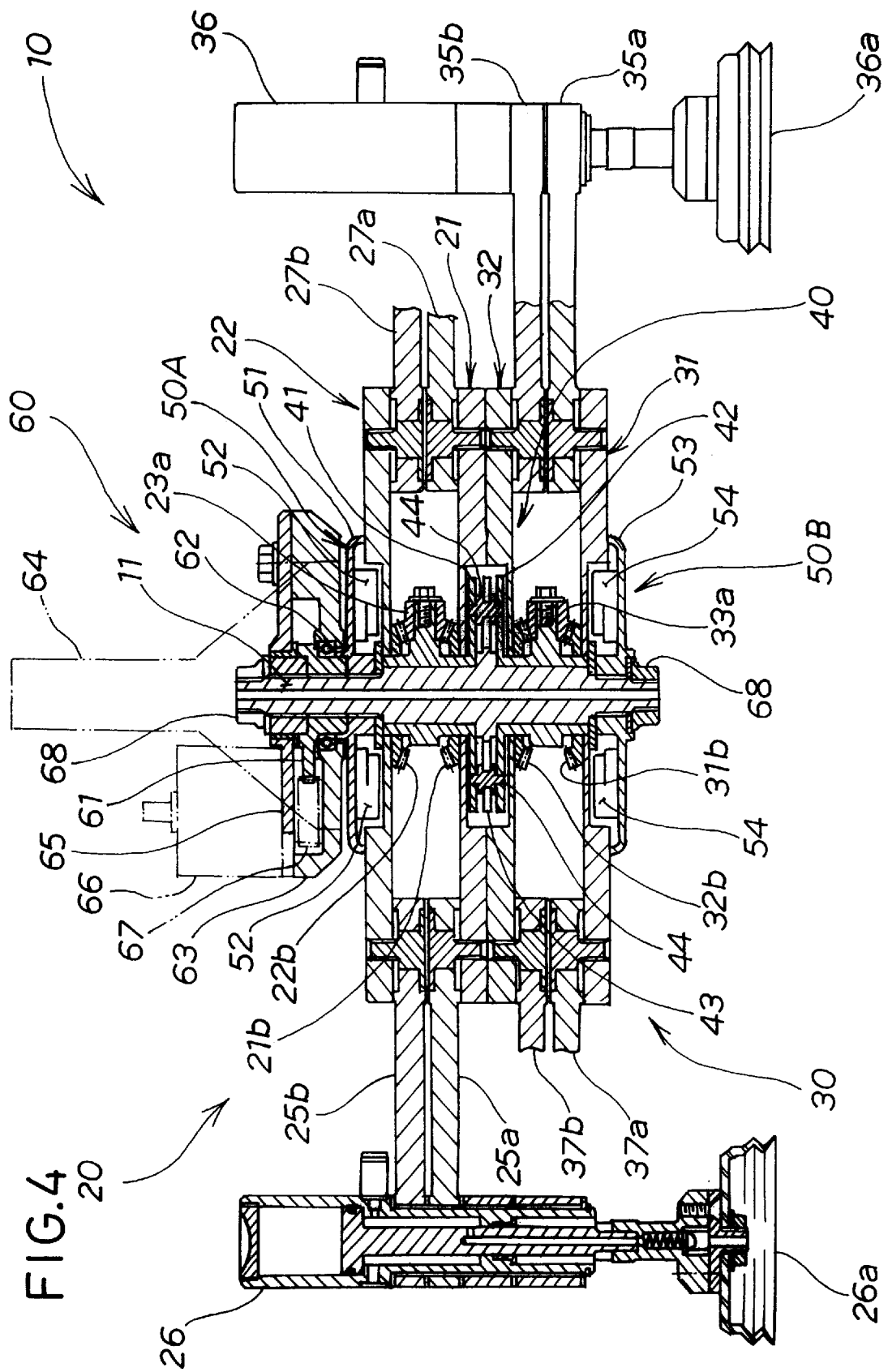
FIG. 4 is a detailed sectional view of the load retaining apparatus of FIG. 2.

FIG. 4 is a detailed sectional view of the load retaining apparatus of FIG. 2. As shown, an upper brake mechanism 50A includes a circular cover 51 spline-jointed to an upper end portion of the main shaft 11 and a pair of brake cylinders 52 attached to the circular cover 51. Similarly, the lower brake mechanism 50B includes a circular cover 53 spline-jointed to a lower end portion of the main shaft 11 and a pair of brake cylinders 54 attached to the circular cover 53. The upper brake mechanism 50A can brake the upper plate 22 of the first load retainer assembly 20 against pivotal movement relative to the main shaft 22 by supplying air to the brake cylinders 52, and the lower brake mechanism 50B can brake the lower plate 31 of the second load retainer assembly 30 against pivotal movement relative to the main shaft 22 by supplying air to the brake cylinders 54. More specifically, activation of the upper and lower brake mechanisms 50A and 50B brakes the first and second load retainer assemblies 20 and 30 in such a way that the two assemblies 20 and 30 are caused to pivot together with the rotation of the main shaft 11. Thus, by the activation of the upper and lower brake mechanisms 50A and 50B, the first and second load retainer assemblies 20 and 30 are held at particular locations as determined by predetermined coupling between the assemblies 20 and 30.

FIG. 5 is a plan view of the load retaining apparatus of FIG. 2. In FIGS. 4 and 5, the suspension unit 60 includes a sector gear 61 spline-jointed to the main shaft 11, and a suspension holder 63 rotatably connected to the sector gear 61 via ball bearings 62 for supporting the main shaft 11. The suspension unit 60 also includes an attachment 64 fixed to the suspension holder 63, a ceiling 65 covering the top of the suspension holder 63, a reversible motor 66 mounted on the ceiling 65, and a gear 67 connected to the rotation shaft of the motor 66.

The attachment 64 of the suspension unit 60 is coupled with the multistage sliding arm 9 as shown in FIG. 2. By the rotation of the motor 66, the main shaft 11 is caused to rotate a desired angle via the gear 67 and sector gear 61. Such rotation of the main shaft 11 causes the first and second load retainer assemblies 20 and 30 to pivot via the synchronizing member 43 and connector pieces 44. When the load W is not properly positioned relative to the suction pads 26a and 36a, the pivotal movement of the first and second load retainer assemblies 20 and 30 allows the suction pads 26a and 36a to move to their respective suitable positions for retaining the load W. Two nuts 68 are secured at the upper and lower ends of the main shaft 11.

Figure 6A:
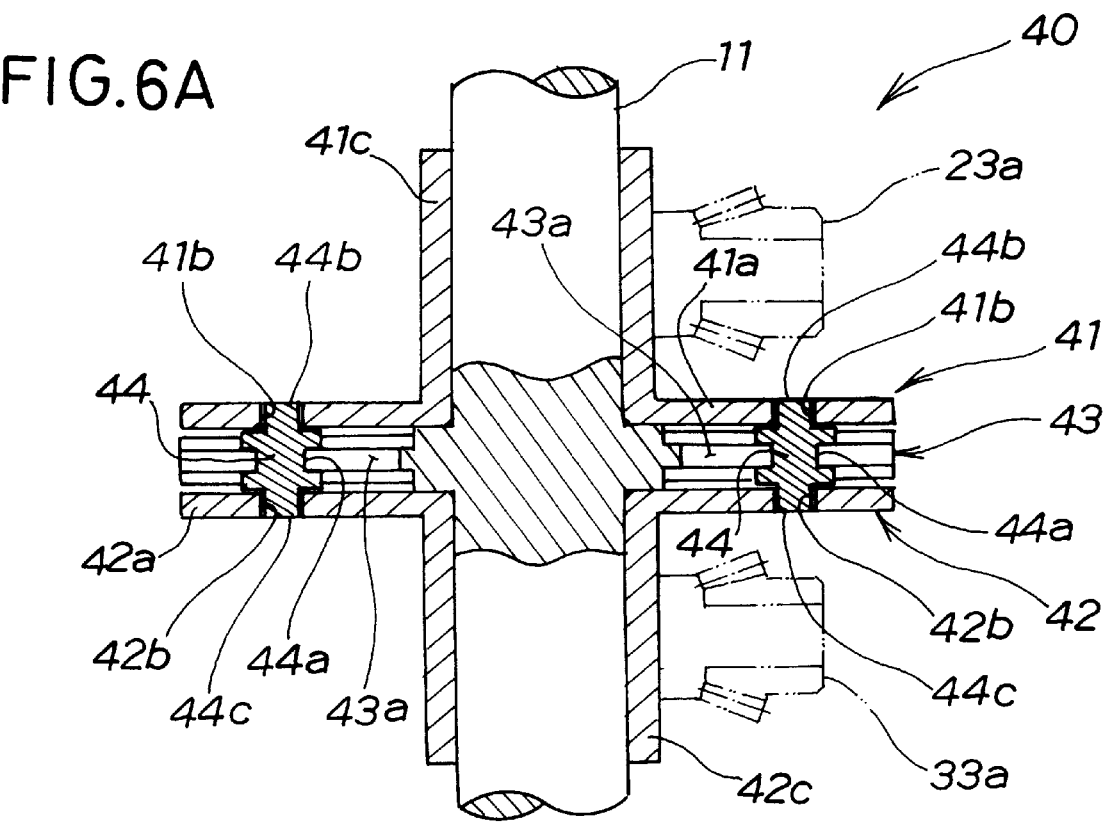
FIGS. 6A and 6B are sectional and plan views of a synchronizing mechanism shown in FIG. 3.
Figure 6B:
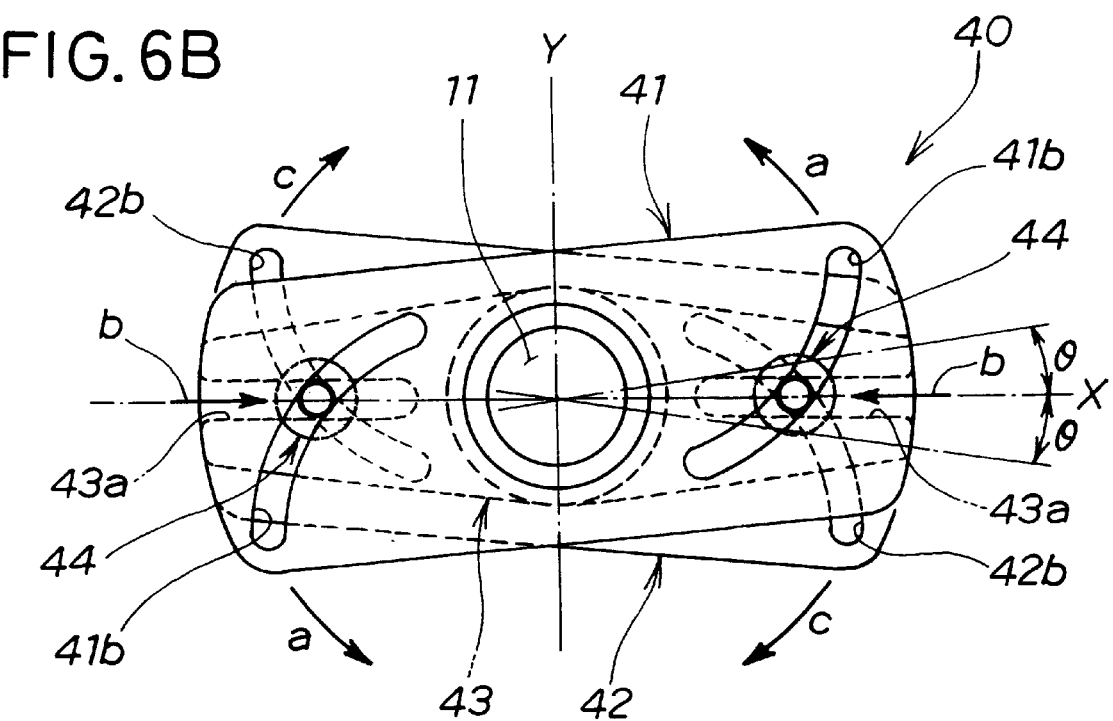

FIGS. 6A and 6B show details of the synchronizing mechanism 40. In FIG. 6A, the first or upper converting member 41 and second or lower converting member 42 of the synchronizing mechanism 40 are both mounted on the main shaft 11 for pivotal movement relative to the shaft 11, but the synchronizing member 43 is fixedly mounted on the main shaft 11 between the first and second converting members 41 and 42 so as not to pivot relative to the shaft 11 (i.e., so as to pivot together with the shaft 11). The first converting member 41 supports thereon the bevel gear 23a of the inverting mechanism 23 and is coupled with the first load retainer assembly 20 by means of the bevel gear 23a. Similarly, the second converting member 42 supports thereon the bevel gear 33a of the inverting mechanism 33 and is coupled with the second load retainer assembly 30 by means of the bevel gear 33a. As previously noted, in each of the movable connector pieces 44, the recessed portion 44a is slidably fitted in one of the through-holes 43a formed in the synchronizing member 43, the upper projection 44b is fitted in one of the arcuate grooves 41b formed in the first converting member 41, and the lower projection 44c is fitted in one of the arcuate grooves 42b formed in the second converting member 42.

As the first converting member 41 is caused to pivot in a direction designated by arrow a in FIG. 6B, each of the connector pieces 44 is pushed at its upper projection 44b inwardly by the edge defining the arcuate groove 41b eccentric to the main shaft 11 and thereby caused to slide along the corresponding through-hole 43a inwardly toward the main shaft 11 in a direction designated by arrow b. As such inward sliding movement of the connector pieces 44 progresses along the through-holes 43a, each of the connector pieces 44, having its lower projection 44a fitted in the arcuate groove 42b, is caused to slide along the corresponding through-hole 43a inwardly toward the main shaft 11, so that the second converting member 42 is caused to pivot in a direction designated by arrow c that is opposite to the pivoting direction of the first converting member 41.

Namely, in the illustrated example, the first and second converting members 41 and 42 are arranged to pivot in opposite directions relative to an "X" axis, so that as the first converting member 41 is turned by an angle θ in one direction, the second converting member 42 is caused to pivot by the same angle θ in the opposite direction, by virtue of the crosswise overlapping relation between the eccentric arcuate grooves 41b of the first converting member 41 and the eccentric arcuate grooves 42b of the second converting member 42.

Now, behavior of the first and second load retainer assemblies 20 and 30 of the load retaining apparatus 10 will be described with reference to FIGS. 7A to 9C.

Figure 7A:
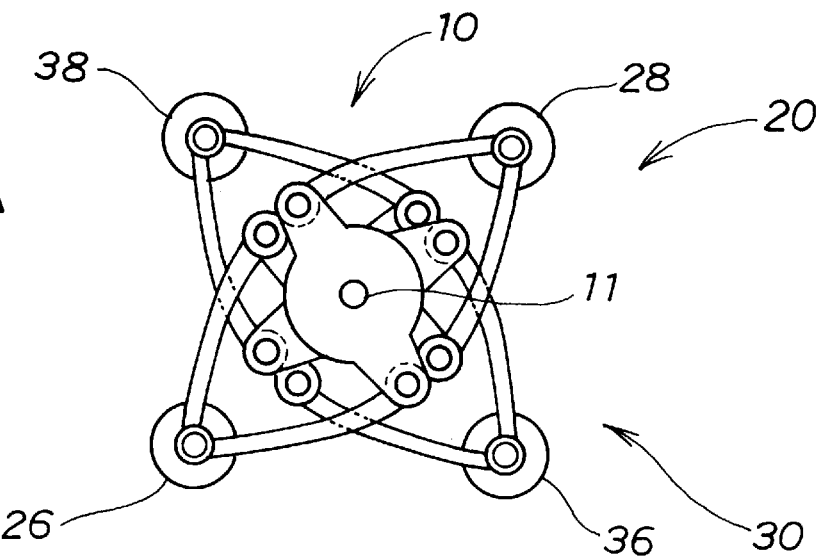
FIG. 7A is a plan view of the load retaining apparatus, showing how first and second load retainer assemblies are coupled together.

FIG. 7A shows the first and second load retainer assemblies 20 and 30 in an unfolded position, where the first and second load retainer assemblies 20 and 30 intersect with each other at right angles and a total of four retaining members 26, 28 and 36, 38 of these load retainer assemblies 20 and 30 are located at four corners, one at each corner, of an imaginary square area defined by the outermost ends of the assemblies 20 and 30.

Figure 7B:
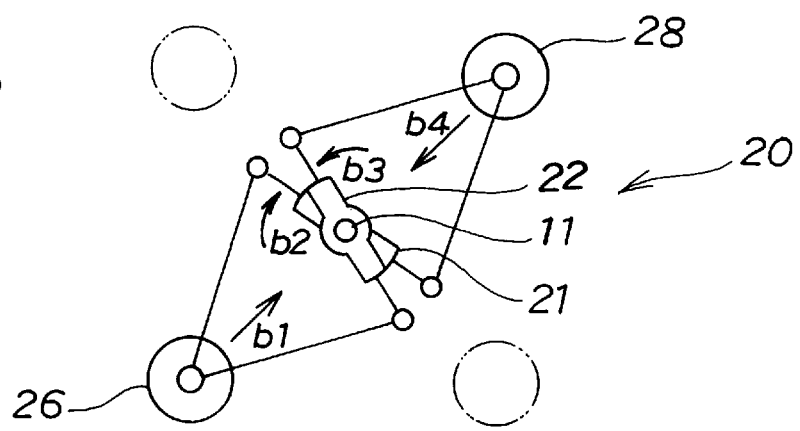
FIGS. 7B and 7C are schematic views explanatory of operation of the first and second load retainer assemblies.

As the retaining member 26 of the first load retainer assembly 20 is moved toward the main shaft 11 as denoted by arrow b1 in FIG. 7B, the lower plate 21 of the first load retainer assembly 20 is caused to pivot in a direction denoted by arrow b2. In response to such pivotal movement of the lower plate 21, the upper plate 22 is caused, via the inverting mechanism 23 (see FIG. 3), to pivot in the opposite direction to the pivoting direction of the lower plate 21, as denoted by arrow b3, in synchronism with the lower plate 21. Thus, the other retaining member 28 of the first load retainer assembly 20 is also moved toward the main shaft 11 as denoted by arrow b4.

Figure 7C:
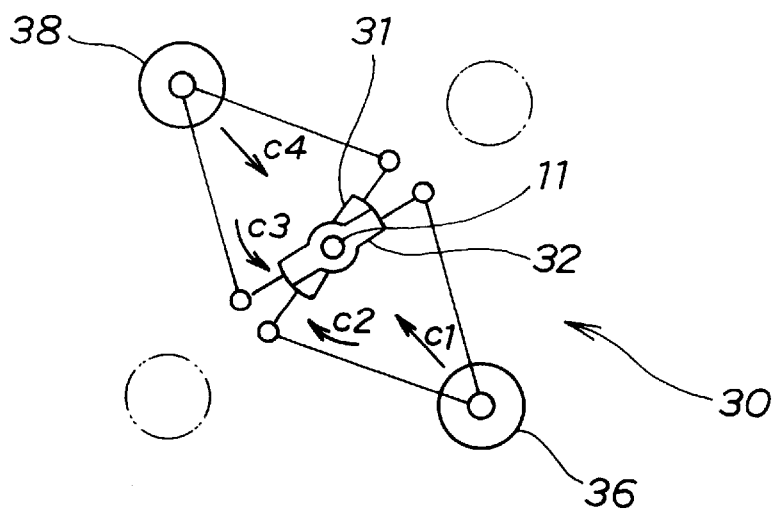

Similarly, as the retaining member 36 of the second load retainer assembly 30 is moved toward the main shaft 11 as denoted by arrow c1 in FIG. 7C, the lower plate 31 of the second load retainer assembly 30 is caused to pivot in a direction denoted by arrow c2. In response to such pivotal movement of the lower plate 31, the upper plate 32 is caused, via the inverting mechanism 33 (see FIG. 3), to pivot in the opposite direction to the pivoting direction of the lower plate 31, as denoted by arrow c3, in synchronism with the lower plate 31. Thus, the other retaining member 38 of the second load retainer assembly 30 is also moved toward the main shaft 11 as denoted by arrow c4.

Figure 8A:
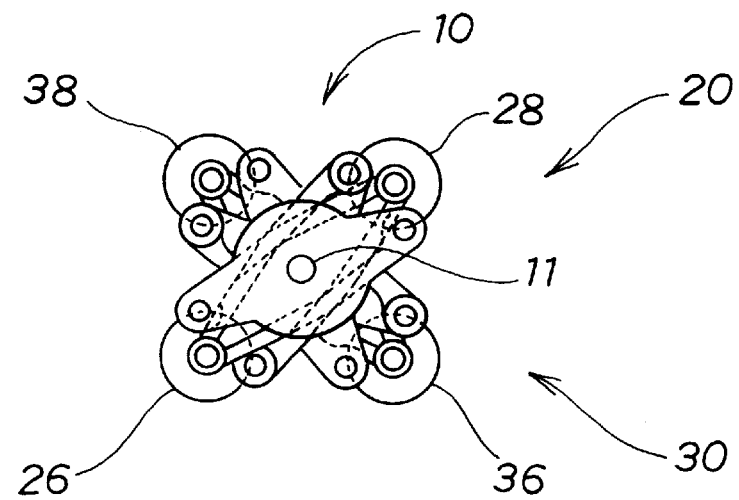
FIG. 8A is a plan view of the load retaining apparatus in a fully folded position.

By the retaining members 26, 28 and 36, 38 of the first and second load retainer assemblies 20 and 30 moving together toward the main shaft 11 in the above-mentioned manner, the load retaining apparatus 10 can collapse from the unfolded position of FIG. 7A to a fully folded position of FIG. 8A.

Figure 8B:
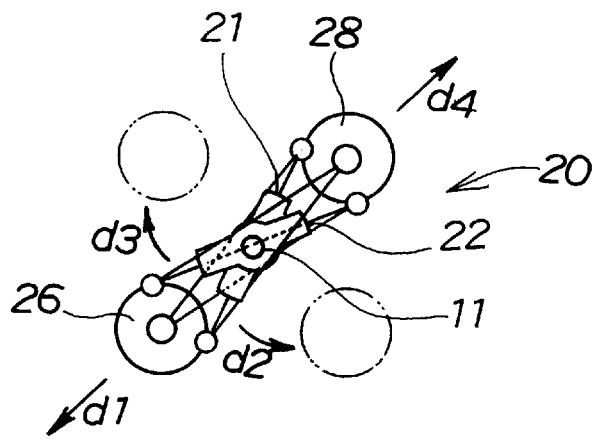
FIGS. 8B and 8C are schematic views explanatory of operation of the first and second load retainer assemblies in the fully folded position.

As the retaining member 26 of the first load retainer assembly 20 in the fully folded position of FIG. 8B is moved away from the main shaft 11 as denoted by arrow d1, the lower plate 21 of the first load retainer assembly 20 is caused to pivot in a direction denoted by arrow d2. In response to such pivotal movement of the lower plate 21, the upper plate 22 is caused, via the inverting mechanism 23, to pivot in the opposite direction to the pivoting direction of the lower plate 21, as denoted by arrow b3, in synchronism with the lower plate 21. Thus, the other retaining member 28 of the first load retainer assembly 20 is also moved away from the main shaft 11 as denoted by arrow d4.

Figure 8C:
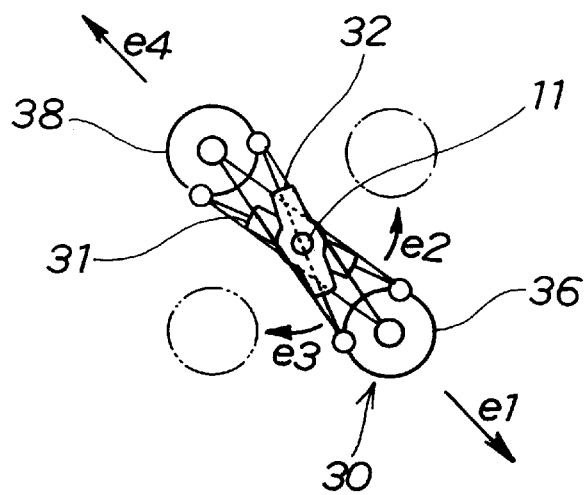

Similarly, as the retaining member 36 of the second load retainer assembly 30 in the fully folded position of FIG. 8C is moved away from the main shaft 11 as denoted by arrow e1, the lower plate 31 of the second load retainer assembly 30 is caused to pivot in a direction denoted by arrow e2. In response to such pivotal movement of the lower plate 31, the upper plate 32 is caused, via the inverting mechanism 23, to pivot in the opposite direction to the pivoting direction of the lower plate 31, as denoted by arrow e3, in synchronism with the lower plate 31. Thus, the other retaining member 38 of the second load retainer assembly 30 is also moved away from the main shaft 11 as denoted by arrow e4.

Figure 9A:
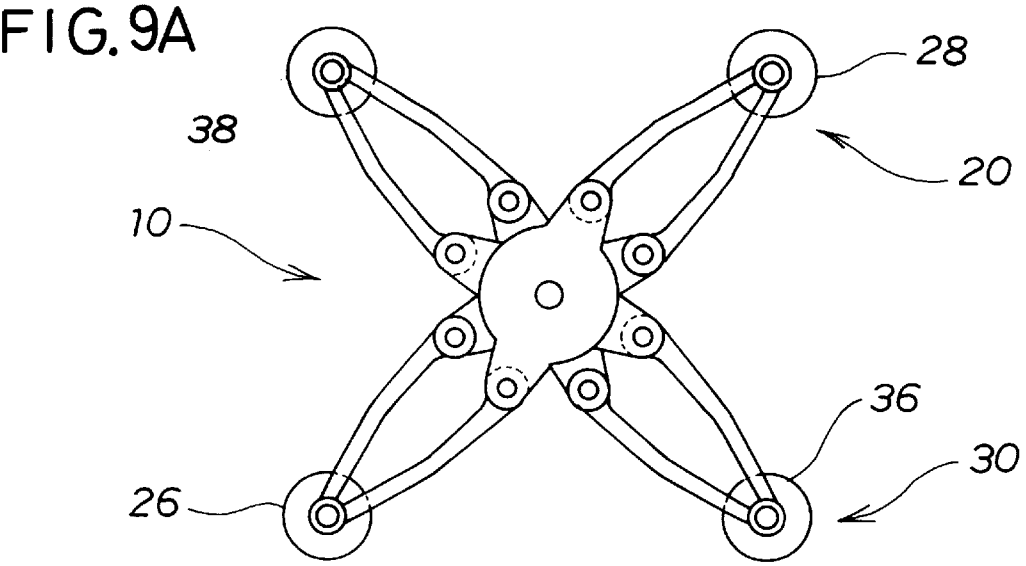
FIG. 9A is a plan view of the load retaining apparatus in an unfolded position.
Figure 9B:
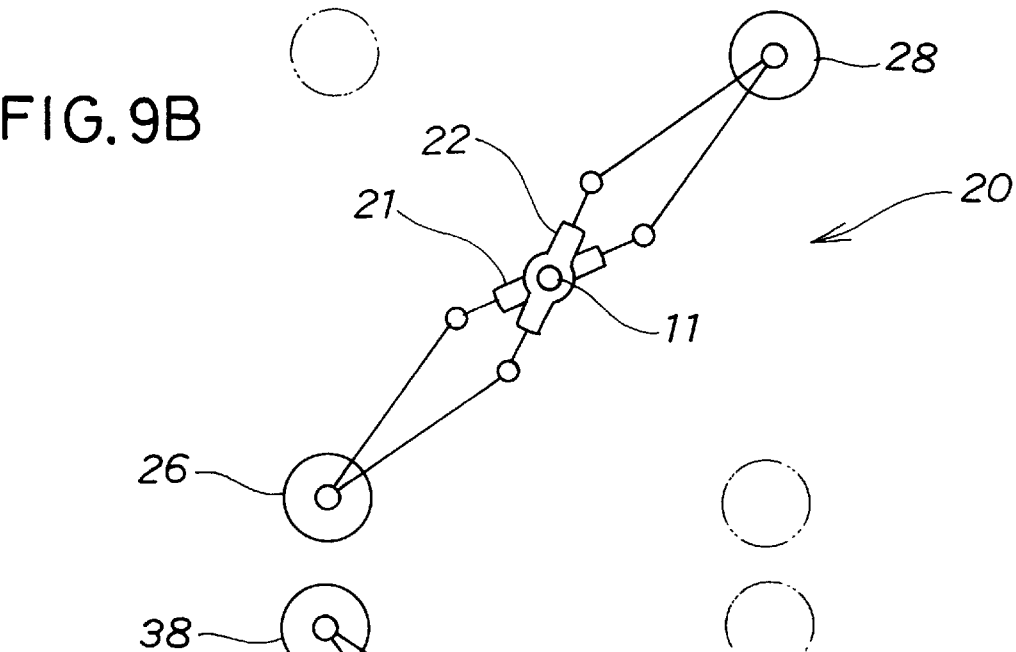
FIGS. 9B and 9C are schematic views explanatory of operation of the first and second load retainer assemblies in the unfolded position.
Figure 9C:
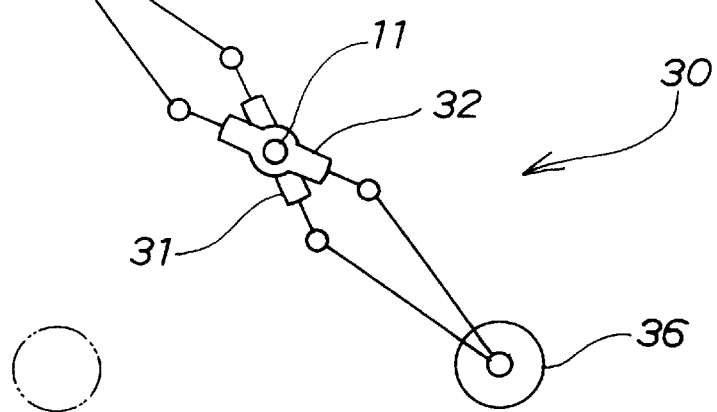

By the retaining members 26, 28 and 36, 38 of the first and second load retainer assemblies 20 and 30 moving together away from the main shaft 11 in the above-mentioned manner, the load retaining apparatus 10 can expand from the folded position to a fully unfolded position of FIG. 9A. In this fully unfolded position, the retaining members 26, 28 and 36, 38 of the first and second load retainer assemblies 20 and 30 are located furthest from the main shaft 11 as shown in FIGS. 9B and 9C, respectively; thus, the first and second load retainer assemblies 20 and 30 intersect with each other at right angles, and the four retaining members 26, 28, 36, 38 are located equidistantly from the main shaft 11 and hence at the four corners of the imaginary square area defined by the outermost ends of the assemblies 20 and 30.

The following paragraphs describe operation of the synchronizing mechanism 40 with reference to FIGS. 10A to 12B.

Figure 10A:
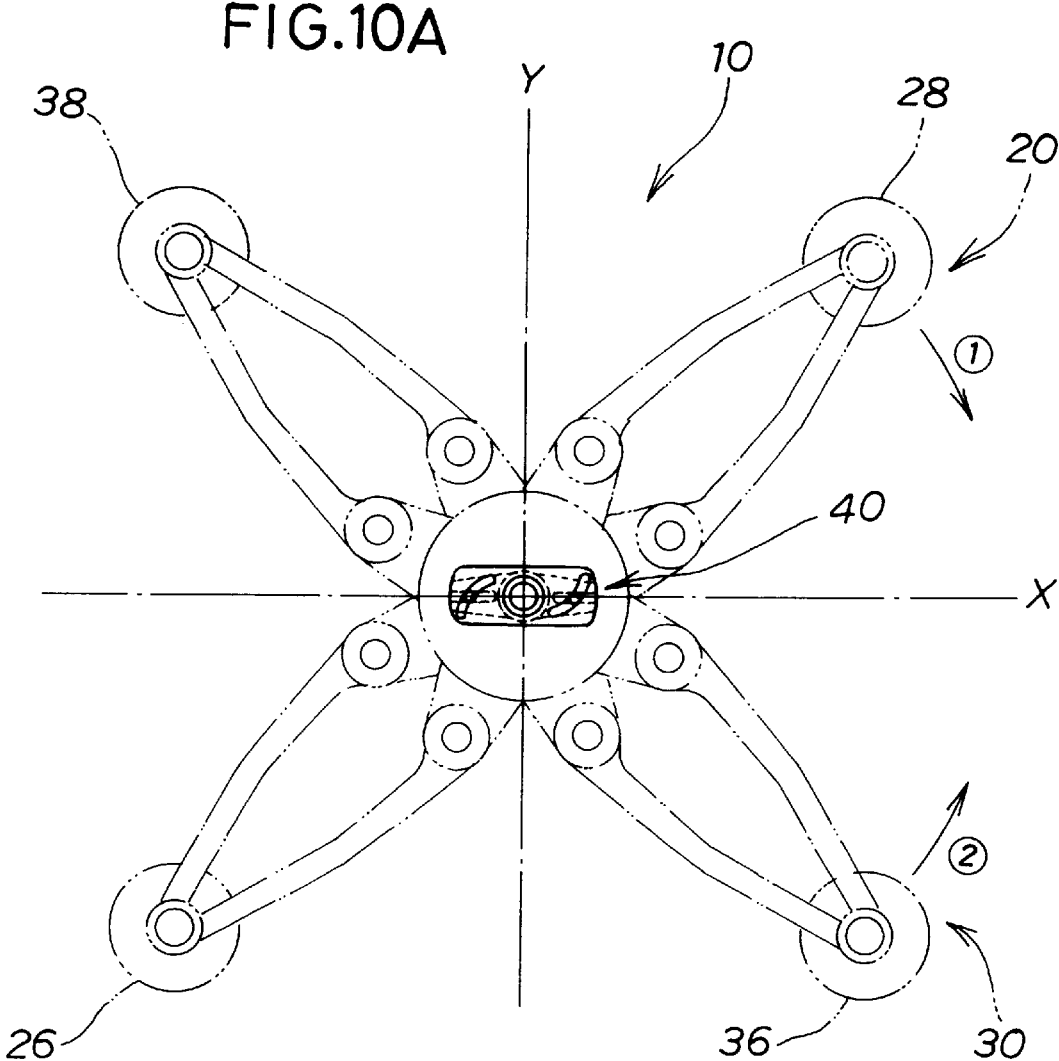
FIGS. 10A and 10B are views explanatory of operational relation between the first and second load retainer assemblies and the synchronizing mechanism.
Figure 10B:
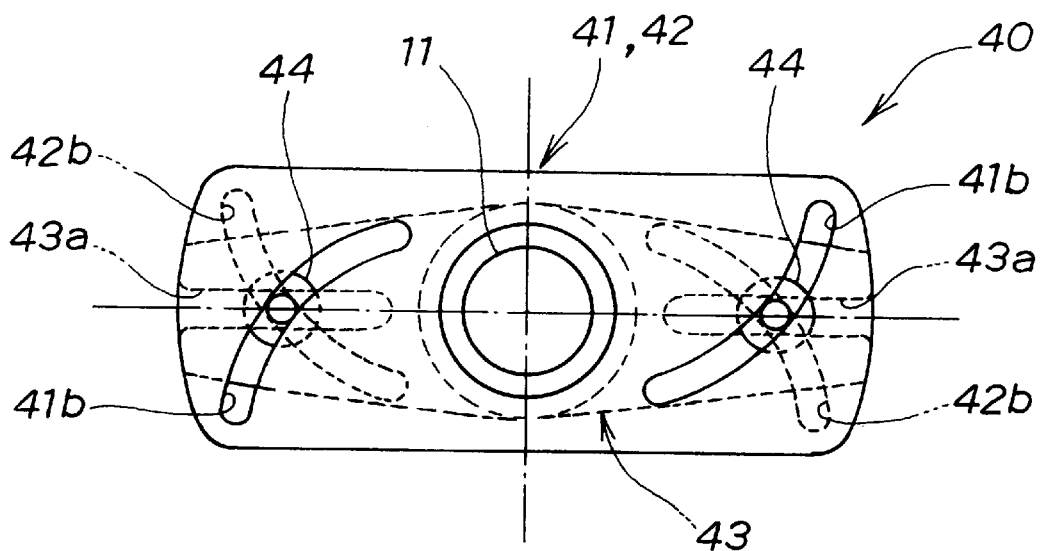

FIG. 10A corresponds to FIG. 9A and shows the first and second load retainer assemblies 20 and 30 in the fully unfolded position, and FIG. 10B shows operation of the synchronizing mechanism 40 when the first and second load retainer assemblies 20 and 30 are in the fully unfolded position. In FIG. 10B, each of the connector pieces 44 is located substantially centrally in the corresponding arcuate grooves 41b and 42b and elongate through-hole 43a of the first and second converting members 41 and 42 and synchronizing member 43, and the first and second converting members 41 and 42 overlap each other almost completely.

Figure 11A:
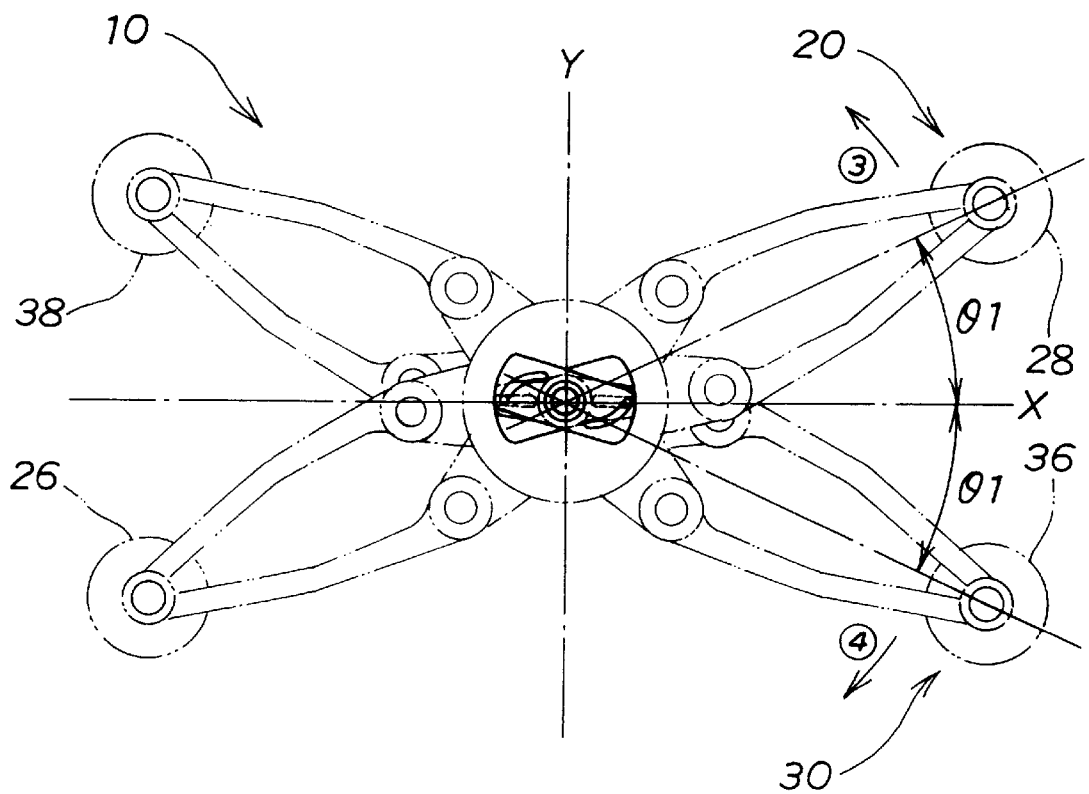
FIGS. 11A and 11B are views, corresponding to FIGS. 10A and 10B, explanatory of operation of the first and second load retainer assemblies when the two assemblies are moved horizontally toward each other.

As the first load retainer assembly 20 is turned from the fully unfolded position as denoted by arrow ①, the second load retainer assembly 30 is caused, via the synchronizing mechanism 40, to pivot in the opposite direction, as denoted by arrow ②, in synchronism with the first load retainer assembly 20, so that the first and second load retainer assemblies 20 and 30 intersect with each other to form a substantially rectangular shape as shown in FIG. 11A.

Figure 11B:
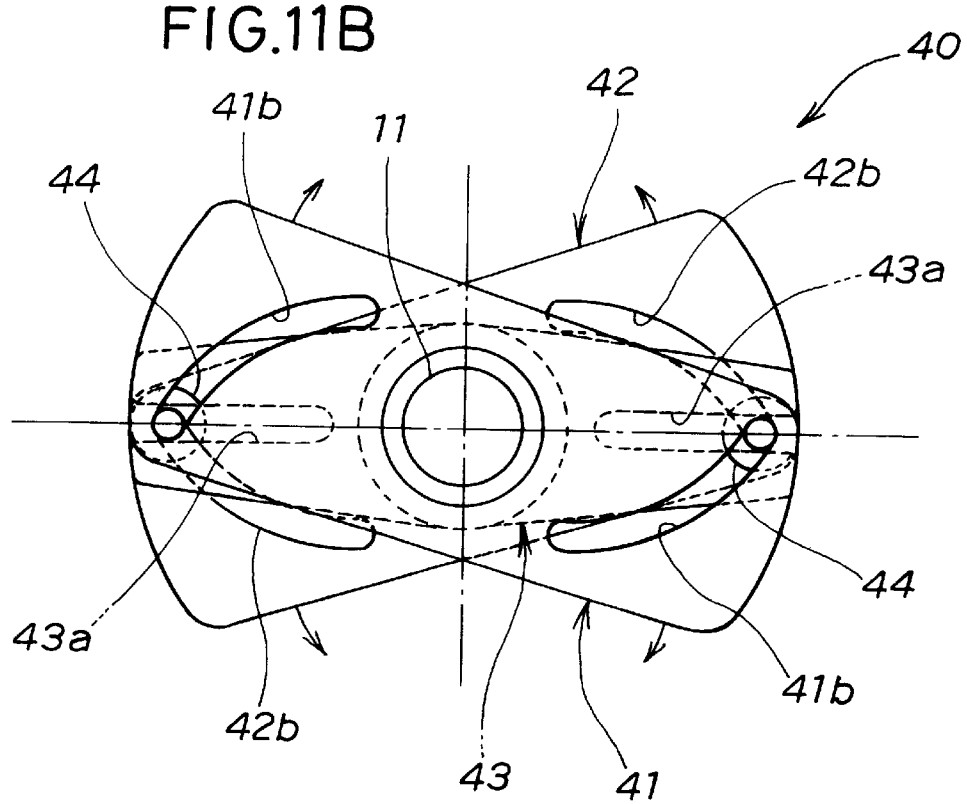

More specifically, by turning the first load retainer assembly 20 from the fully unfolded position as denoted by arrow ①, the first converting member 41 of the synchronizing mechanism 40 is caused to pivot clockwise about the main shaft 11 as shown in FIG. 11B. In response to the pivotal movement of the first converting member 41, the upper projection of each of the connector pieces 44 moves along the corresponding eccentric arcuate groove 41b to the outer end of the groove 41b remotest from the main shaft 11 and simultaneously moves to the outer end of the elongate through-hole 43a in the synchronizing member 43. By such movement of the connector pieces 44, the second converting member 42, coupled with the connector pieces 44 through the eccentric arcuate grooves 42b, is caused to pivot in the opposite direction to the pivoting direction of the first load retainer assembly 20 as the connector pieces 44 are each guided at the lower projection in a direction toward the outer end of the grooves 42b remotest from the main shaft 11. Namely, the connector pieces 44 move to the outer ends of the arcuate grooves 41b and 42b of the first and second converting members 41 and 42, during which time they move close to the outer ends of the elongate through-holes 43a. In this position, the angle of the first load retainer assembly 20 relative to the X axis and the angle of the second load retainer assembly 30 relative to the X axis are both θ1, as shown in FIG. 11A.

Figure 12A:
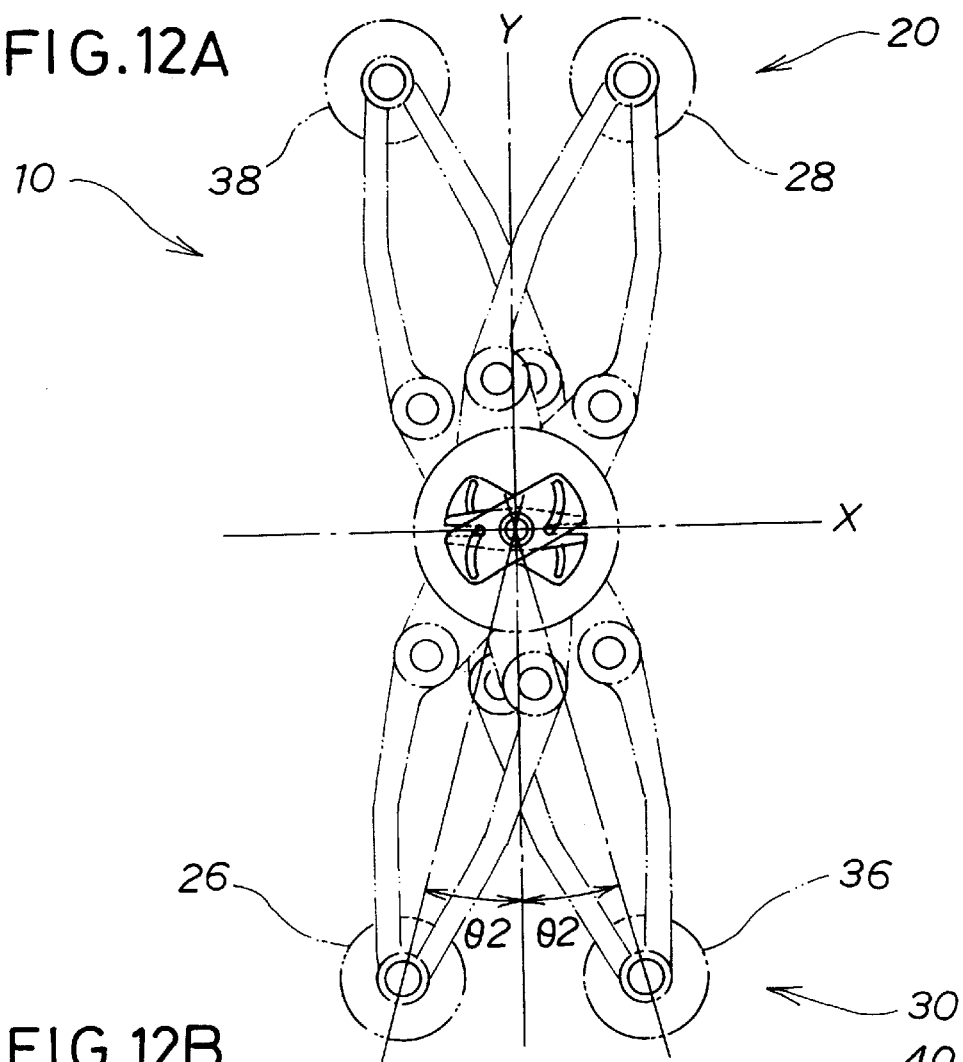
FIGS. 12A and 12B are views, corresponding to FIGS. 10A and 10B, explanatory of operation of the first and second load retainer assemblies when the two assemblies are moved vertically toward each other.

Then, as the first load retainer assembly 20 is turned as denoted by arrow ③ in FIG. 11A, the second load retainer assembly 30 is caused to pivot in the opposite direction to the first load retainer assembly 20 as denoted by arrow ④, so that the first and second load retainer assemblies 20 and 30 intersect with each other to form a vertical rectangular shape as shown in FIG. 12A.

Figure 12B:
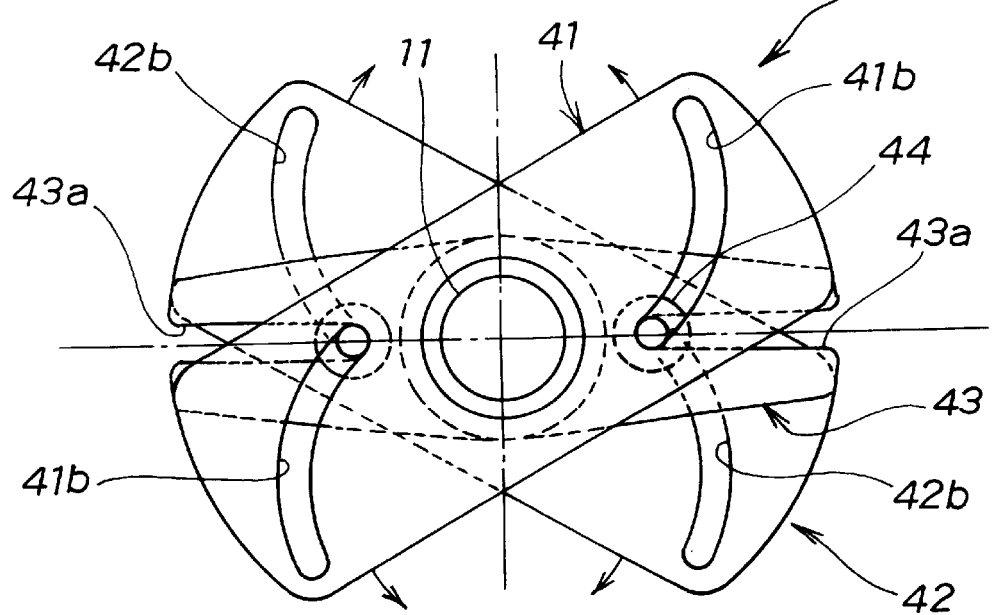

Namely, by turning the first load retainer assembly 20 as denoted by arrow ③ in the state of FIG. 11A, the first converting member 41 of the synchronizing mechanism 40 is caused to pivot in the counterclockwise direction as arrowed in FIG. 12B. In response to such pivotal movement of the first converting member 41, each of the connector pieces 44 moves to the other end of the corresponding arcuate groove 41b closest to the main shaft 11 and, at the same time, to the innermost end of the corresponding elongate through-hole 43a proximate to the main shaft 11. By such movement of the connector pieces 44 toward the main shaft 11, the second converting member 42 is caused to pivot in the opposite direction to the first converting member 41 while being guided by the eccentric arcuate grooves 42b. In this position, the angle of the first load retainer assembly 20 relative to the Y axis and the angle of the second load retainer assembly 30 relative to the Y axis are both θ2, as shown in FIG. 12A.

In the above-described manner, as the first load retainer assembly 20 is turned in one direction, the synchronizing mechanism 40 allows the second load retainer assembly 30 to pivot in the opposite direction to and in synchronism with the pivotal movement of the first load retainer assembly 20.

Figure 13:
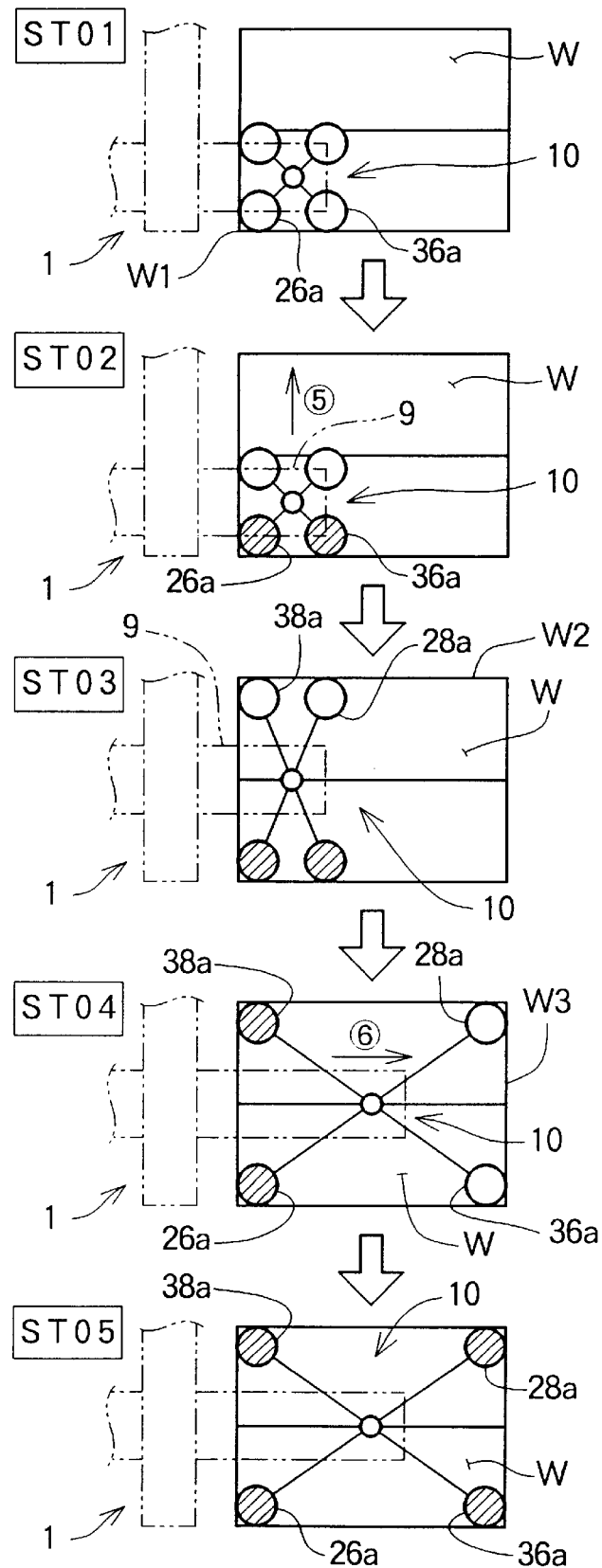
FIG. 13 is a diagram showing an operational sequence taking place when the load retaining apparatus is moved to the unfolded position to retain a load.

FIG. 13 is a diagram showing an operational sequence taking place when the load retaining apparatus 10 of the present invention is to be unfolded for retaining a load W. At first step ST01, the load retaining apparatus 10 is placed in the fully folded position as described above in relation to FIG. 8A, and the suction pad 26a is positioned at one corner portion of the load W.

At second step ST02, two suction pads 26a and 36a, out of the four suction pads of the apparatus 10, are activated to adhere to the load W by suction, and then the multistage sliding arm 9 is moved laterally as denoted by arrow ⑤.

At third step ST03, the other suction pads 38a and 28a are extended up to one edge W2 of the load W, upon which the lateral movement of the sliding arm 9 is terminated.

At fourth step ST04, the load W is released from the suctional adherence by the suction pads 36a, and the sliding arm 9 is moved forward as denoted by arrow ⑥ with the suction pads 26a and 38a adhering to the load W. Then, the suction pads 28a and 36a are extended up to another edge W3 of the load W, upon which the forward movement of the sliding arm 9 is terminated.

At fifth step ST05, the suction pads 28a and 36a are activated to adhere to the load W, so that the work W is suspended by means of the four suction pads 26a, 28a, 36a and 38a.

What is claimed is:

1. A load retainer assembly for retaining a load by suction to carry the load to a desired place, said load retainer assembly comprising:

a main shaft;

a lower plate pivotably mounted on said main shaft and including a pair of left and right swing arms;

an upper plate pivotably mounted on said main shaft in parallel relation to said lower plate and including a pair of left and right swing arms;

an inverting mechanism disposed between said lower plate and said upper plate, for, as said lower plate is pivoted, causing said upper plate to pivot in an opposite direction to a pivoting direction of said lower plate;

a first retaining member for interconnecting distal end portions of a pair of links pivotably connected to one of the swing arms of said lower plate and one of the swing arms of said upper plate, respectively;

a second retaining member for interconnecting distal end portions of another pair of links pivotably connected to the other swing arm of said lower plate and the other swing arm of said upper plate, respectively; and suction pads attached to said first retaining member and said second retaining member, respectively, to retain the load by suction, wherein said first retaining member and said second retaining member are movable toward and away from each other by causing said upper plate to pivot in the opposite direction to the pivoting direction of said lower plate.

2. A load retaining apparatus for retaining a load by suction to carry the load to a desired place, said load retaining apparatus comprising:

(a) a pair of upper and lower load retainer assemblies; each of said load retainer assemblies comprising:
a main shaft;
a lower plate pivotably mounted on said main shaft and including a pair of left and right swing arms;
an upper plate pivotably mounted on said main shaft in parallel relation to said lower plate and including another pair of left and right swing arms;
an inverting mechanism disposed between said lower plate and said upper plate, for, as said lower plate is pivoted, causing said upper plate to pivot in an opposite direction to a pivoting direction of said lower plate;
a first retaining member for interconnecting distal end portions of a pair of links pivotably connected to one of the swing arms of said lower plate and one of the swing arms of said upper plate, respectively;
a second retaining member for interconnecting distal end portions of another pair of links pivotably connected to the other swing arm of said lower plate and the other swing arm of said upper plate, respectively; and
suction pads attached to said first retaining member and said second retaining member, respectively, to retain the load by suction,
said upper and lower load retainer assemblies being coupled together in overlapping relation to each other in such a manner that a total of four said retaining members of said upper and lower load retainer assemblies are located at four corners of an imaginary rectangular area defined by outermost ends of said upper and lower load retainer assemblies; and (b) a synchronizing mechanism disposed between said upper and lower load retainer assemblies, for, as said upper load retainer assembly is pivoted, causing said lower load retainer assembly to pivot in an opposite direction to a pivoting direction of said upper load retainer assembly.

3. A load retaining apparatus as recited in claim 2 which further comprises an upper brake mechanism for braking said upper load retainer assembly against pivotal movement relative to said main shaft, and a lower brake mechanism for braking said lower load retainer assembly against pivotal movement relative to said main shaft.

* * * * *